(12) United States Patent
Okada et al.

(10) Patent No.: US 9,645,364 B2
(45) Date of Patent: May 9, 2017

(54) IMAGING LENS AND IMAGING APPARATUS

(71) Applicant: FUJIFILM Corporation, Tokyo (JP)

(72) Inventors: Kazuyoshi Okada, Saitama (JP); Ping Sun, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/070,690

(22) Filed: Mar. 15, 2016

(65) Prior Publication Data

US 2016/0291296 A1    Oct. 6, 2016

(30) Foreign Application Priority Data

Mar. 31, 2015 (JP) ................. 2015-071087

(51) Int. Cl.
*G02B 13/04* (2006.01)
*G02B 13/06* (2006.01)
G02B 13/00 (2006.01)

(52) U.S. Cl.
CPC ............ *G02B 13/06* (2013.01); *G02B 13/006* (2013.01)

(58) Field of Classification Search
CPC ............................... G02B 13/06; G02B 13/006
USPC ........................................................ 359/750
See application file for complete search history.

(56) References Cited

U.S. PATENT DOCUMENTS

2005/0219715 A1* 10/2005 Kimura .................. G02B 13/06
359/749

FOREIGN PATENT DOCUMENTS

JP            63-003286 B2    1/1988

* cited by examiner

*Primary Examiner* — Alicia M Harrington
(74) *Attorney, Agent, or Firm* — Studebaker & Brackett PC

(57) ABSTRACT

An imaging lens consists of, in order from the object side, a front group having a negative refractive power, a stop, and a rear group having a positive refractive power. The front group consist of a front-group negative lens group that consists of three negative lenses and has a negative refractive power, and a front-group positive lens group that includes one positive lens and one negative lens and has a positive refractive power, where the negative lens is disposed at the most image-side position. The rear group includes two positive lenses and two negative lenses. The imaging lens satisfies condition expression (1): $0.95 < -fAn/f < 2$, where $fAn$ is a focal length of the front-group negative lens group, and $f$ is a focal length of the entire system.

13 Claims, 11 Drawing Sheets

EXAMPLE 1

EXAMPLE 5

IMAGING LENS AND IMAGING APPARATUS

CROSS-REFERENCE TO RELATED APPLICATIONS

The present application claims priority under 35 U.S.C. §119 to Japanese Patent Application No. 2015-071087, filed on Mar. 31, 2015. The above application is hereby expressly incorporated by reference, in its entirety, into the present application.

BACKGROUND

The present disclosure relates to an imaging lens and an imaging apparatus, and more particularly to an imaging lens that is suitably usable with monitoring cameras, vehicle mounted cameras, digital cameras, etc., and an imaging apparatus provided with the imaging lens.

With monitoring cameras and vehicle mounted cameras, wide angle imaging lenses are used by choice so that imaging with a wide field of view can be performed. For example, a lens system having a full angle of view of nearly 180° may be used to reduce or eliminate blind spots. As the above-described type of wide angle lens system, a fisheye lens disclosed in Japanese Examined Patent Publication No. 63-003286 (hereinafter, Patent Document 1), for example, is known.

SUMMARY

Imaging lenses for use with imaging apparatuses of the above-mentioned fields are desired to be compact in view of installation space and portability, and have a small F-number so as to accommodate low light environments, in addition to having a wide angle of view. Further, in recent years, it is common to use an image sensor, such as a CCD (Charge Coupled Device), in combination with an imaging lens. Along with development of image sensors with higher pixel density year after year, high performance imaging lenses capable of obtaining high resolution images to accommodate the high-pixel density image sensors are demanded.

The lens system disclosed in Patent Document 1, however, does not have a sufficiently small F-number, and still needs improvement of aberration correction. In order to accommodate the recent demand, even higher performance imaging lenses are desired.

In view of the above-described circumstances, the present disclosure is directed to providing an imaging lens that has a wide angle of view, is compact, has a small F-number, and has high optical performance, as well as an imaging apparatus provided with the imaging lens.

An imaging lens of the disclosure consists of, in order from the object side, a front group having a negative refractive power, a stop, and a rear group having a positive refractive power, wherein the front group consists of, in order from the object side, a front-group negative lens group having a negative refractive power and a front-group positive lens group having a positive refractive power, the front-group negative lens group consists of three negative lenses, the front-group positive lens group includes one positive lens and one negative lens that is disposed at the most image-side position of the front-group positive lens group, the rear group includes two positive lenses and two negative lenses, and the condition expression (1) below is satisfied:

$$0.95 < -fAn/f < 2 \tag{1},$$

where fAn is a focal length of the front-group negative lens group, and f is a focal length of the entire system.

In the imaging lens of the disclosure, it is preferred that the condition expression (1-1) below be satisfied:

$$1 < -fAn/f < 1.5 \tag{1-1}.$$

In the imaging lens of the disclosure, it is preferred that the condition expression (2) below be satisfied, and it is more preferred that the condition expression (2-1) below be satisfied:

$$0.7 < -fA/fB < 10 \tag{2},$$

$$0.75 < -fA/fB < 9 \tag{2-1},$$

where fA is a focal length of the front group, and fB is a focal length of the rear group.

In the imaging lens of the disclosure, it is preferred that the condition expression (3) below be satisfied, and it is more preferred that the condition expression (3-1) below be satisfied:

$$0.3 < f/fB < 0.6 \tag{3},$$

$$0.305 < f/fB < 0.5 \tag{3-1},$$

where fB is a focal length of the rear group, and f is a focal length of the entire system.

In the imaging lens of the disclosure, it is preferred that the condition expressions (4) and (5) below be satisfied, and it is more preferred that the condition expressions (4) and (5) below be satisfied and at least one of the condition expressions (4-1) and (5-1) below be satisfied:

$$55 < vd3 < 96 \tag{4},$$

$$0.003 < \Delta\theta gF3 < 0.05 \tag{5},$$

$$60 < vd3 < 70 \tag{4-1},$$

$$0.004 < \Delta\theta gF3 < 0.006 \tag{5-1},$$

where $vd3$ is an Abbe number with respect to the d-line of the most image-side negative lens of the front-group negative lens group, and $\Delta\theta gF3$ is an anomalous dispersion property of the most image-side negative lens of the front-group negative lens group.

It is preferred that each of the first and the second lenses from the object side of the front-group negative lens group of the imaging lens of the disclosure be a negative meniscus lens with the convex surface toward the object side.

It is preferred that the rear group of the imaging lens of the disclosure include a cemented lens formed by, in order from the object side, a negative lens and a biconvex positive lens that are cemented together.

In the case where the rear group of the imaging lens of the disclosure includes at least one cemented lens, the most object-side cemented lens of the at least one cemented lens included in the rear group may be formed by, in order from the object side, a positive lens and a negative lens that are cemented together, and may have the cemented surface that is a convex surface toward the image side.

It should be noted that the expression "consisting/consist of" as used herein means "consisting/consist essentially of" and that, besides the elements recited above, lenses substantially without any power; optical elements other than lenses, such as a stop, a cover glass, and filters; and mechanical components, such as a lens flange, a lens barrel, a camera shake correction mechanism, etc., may be included.

It should be noted that, with respect to any lens including an aspheric surface of the imaging lens of the disclosure, the surface shape of the lens and the sign (positive or negative) of the refractive power of the lens or the lens group including the lens is about the paraxial region.

It should be noted that the sign (positive or negative) of the refractive power of each group of the imaging lens of the disclosure indicates that the corresponding group as a whole has a positive refractive power or a negative refractive power.

An imaging apparatus of the disclosure comprise the imaging lens of the disclosure.

The lens system according to the disclosure consists of, in order from the object side, a negative front group, a stop, and a positive rear group, wherein the configuration of the lenses included in each group is favorably set, and the given condition expression(s) is satisfied. This allows providing an imaging lens that has a wide angle of view, is compact, has a small F-number, and has high optical performance, as well as an imaging apparatus provided with the imaging lens.

DETAILED DESCRIPTION OF THE PREFERRED EMBODIMENTS

Figure 1:
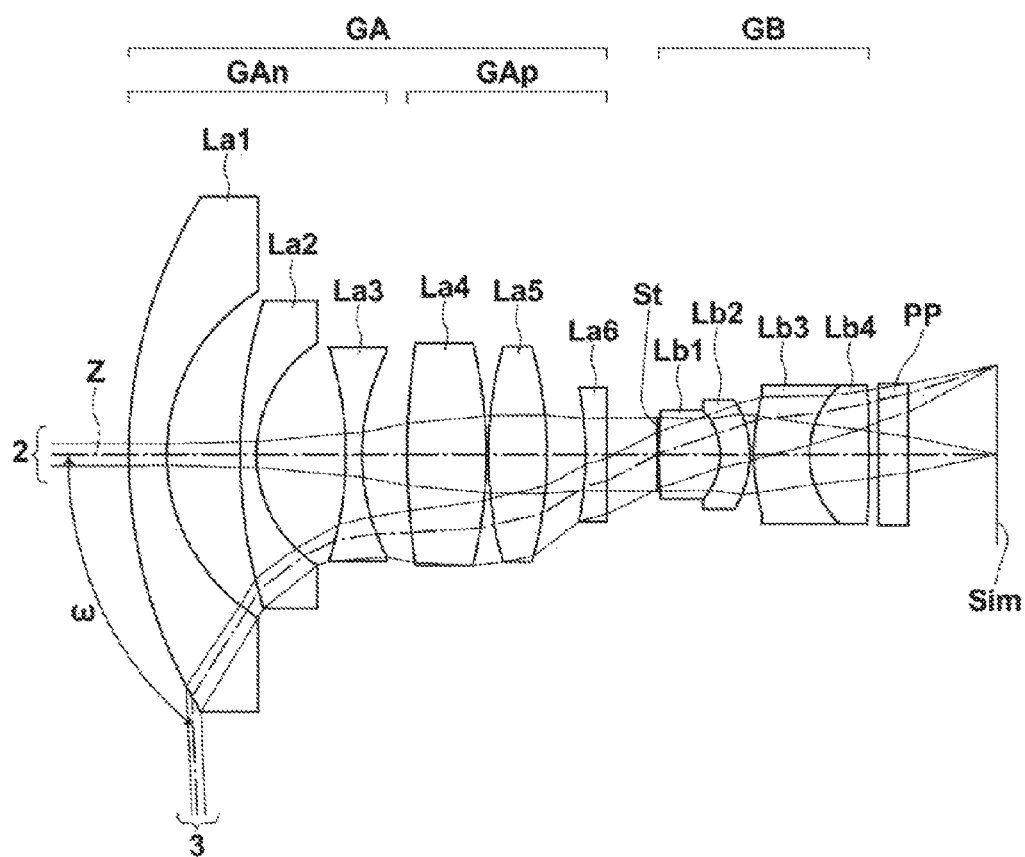
FIG. 1 is a sectional view showing the configuration of and optical paths through an imaging lens of Example 1 of the disclosure.

Hereinafter, an embodiment of the present disclosure will be described in detail with reference to the drawings. FIGS. 1 to 5 are sectional views showing the configurations of imaging lenses according to embodiments of the disclosure and optical paths through the individual imaging lenses, which correspond to Examples 1 to 5, which will be described later, respectively. The examples shown in FIGS. 1 to 5 have the same basic configuration and are shown in the drawings in the same manner, and therefore the following description is made mainly with reference to the example shown in FIG. 1. In FIG. 1, the left side is the object side and the right side is the image side, and the optical paths shown are of an axial bundle of rays 2 and an off-axis bundle of rays 3 at the maximum angle of view, where the maximum half angle of view ω is also shown.

This imaging lens consists essentially of, in order from the object side along the optical axis Z, a front group GA having a negative refractive power, an aperture stop St, and a rear group GB having a positive refractive power. Disposing the lens group having a negative refractive power and the lens group having a positive refractive power in this order from the object side to form a retrofocus lens system that is asymmetric relative to the aperture stop St is advantageous for achieving a wide angle of view and ensuring a sufficient back focus. It should be noted that the aperture stop St shown in FIG. 1 does not necessarily represent the size and the shape thereof, but represents the position thereof along the optical axis Z.

When this imaging lens is applied to an imaging apparatus, a cover glass, various filters, such as an infrared cut-off filter and a low-pass filter, etc., may be provided between the lens system and the image plane Sim, depending on the configuration of the imaging apparatus. In the example shown in FIG. 1, an optical member PP in the form of a plane-parallel plate, which is assumed to represent the above-mentioned elements, is disposed between the lens system and the image plane Sim. However, the position of the optical member PP is not limited to one shown in FIG. 1, or a configuration where the optical member PP is omitted is also possible.

The front group GA consists essentially of, in order from the object side, a front-group negative lens group GAn having a negative refractive power, and a front-group positive lens group GAp having a positive refractive power. The front-group negative lens group GM consists essentially of three negative lenses. The front-group negative lens group GM having the above-described configuration allows concentrating the negative refractive power of the entire system on the object side, and this allows achieving a wide angle of view while reducing increase of the diameter of the lens system. This also allows each of the three negative lenses to share a part of the negative refractive power of the front group GA, thereby allowing suppressing spherical aberration, which is advantageous for achieving a lens system having a small F-number. It should be noted that, in the example shown in FIG. 1, the front-group negative lens group GM consists of, in order from the object side, negative lenses La1 to La3.

It is preferred that each of the first and the second lenses from the object side of the front-group negative lens group GM be a negative meniscus lens with the convex surface toward the object side. This configuration allows gradually bending the off-axis rays by the two lenses to suppress off-axis aberrations.

The front-group positive lens group GAp includes one positive lens and one negative lens. The negative lens is disposed at the most image-side position of the front-group positive lens group GAp. The front-group positive lens group GAp having the above-described configuration allows successfully correcting spherical aberration and lateral chromatic aberration. The negative lens disposed at the most image-side position of the front-group positive lens group GAp contributes to ensuring the negative refractive power of the front group GA to facilitate ensuring the back focus, and is also advantageous for suppressing lateral chromatic aberration.

Figure 2:
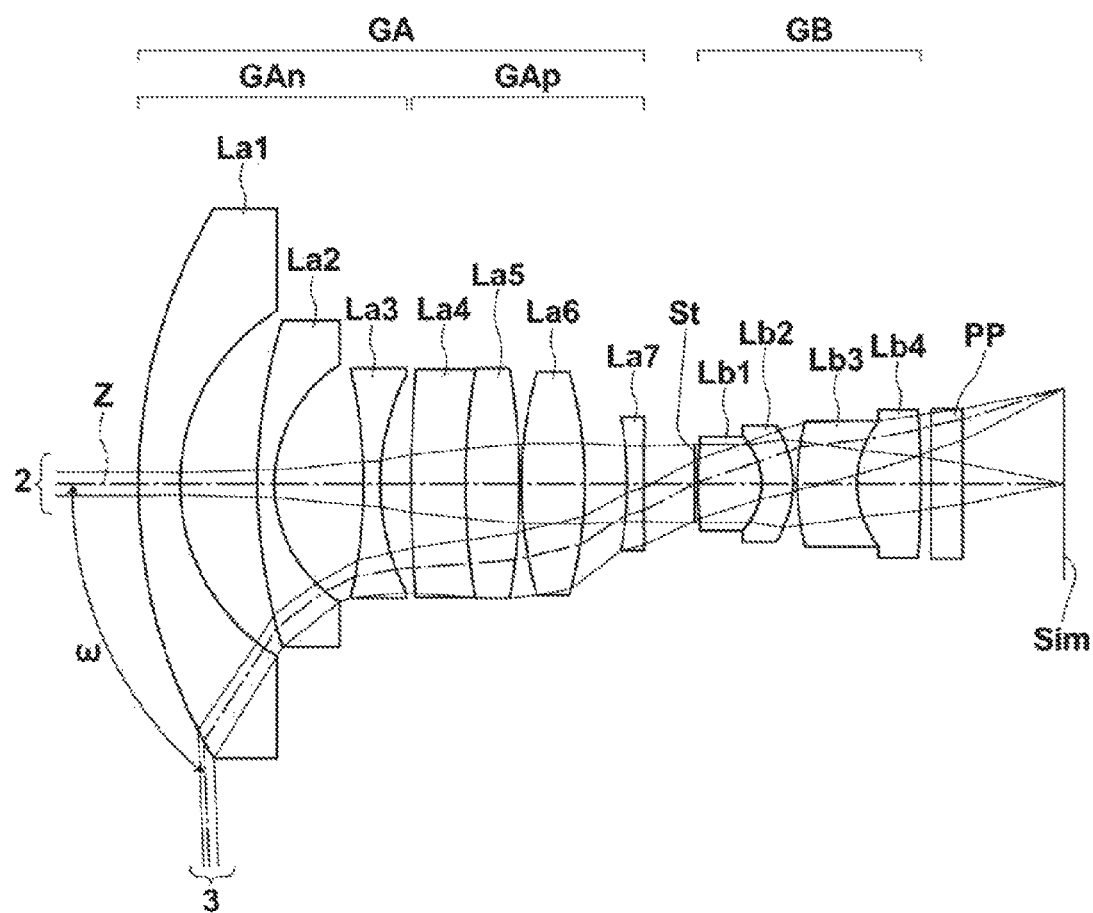
FIG. 2 is a sectional view showing the configuration of and optical paths through an imaging lens of Example 2 of the disclosure.
Figure 3:
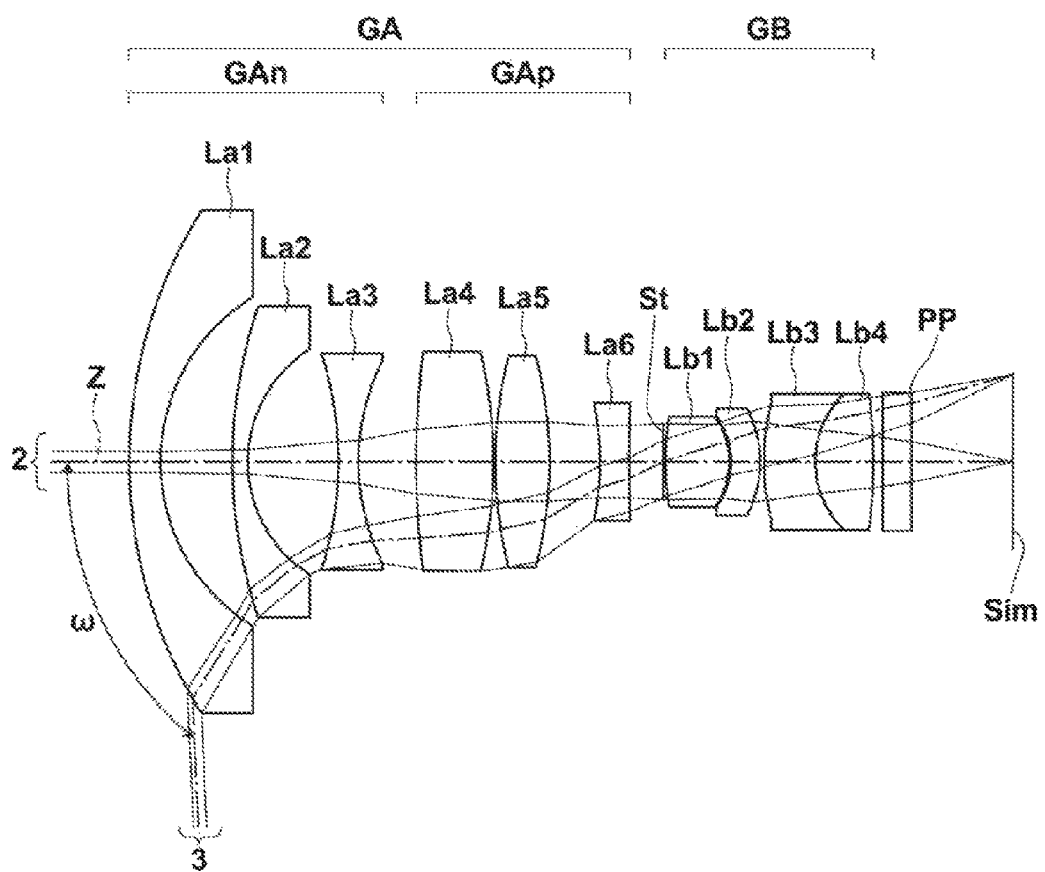
FIG. 3 is a sectional view showing the configuration of and optical paths through an imaging lens of Example 3 of the disclosure.
Figure 4:
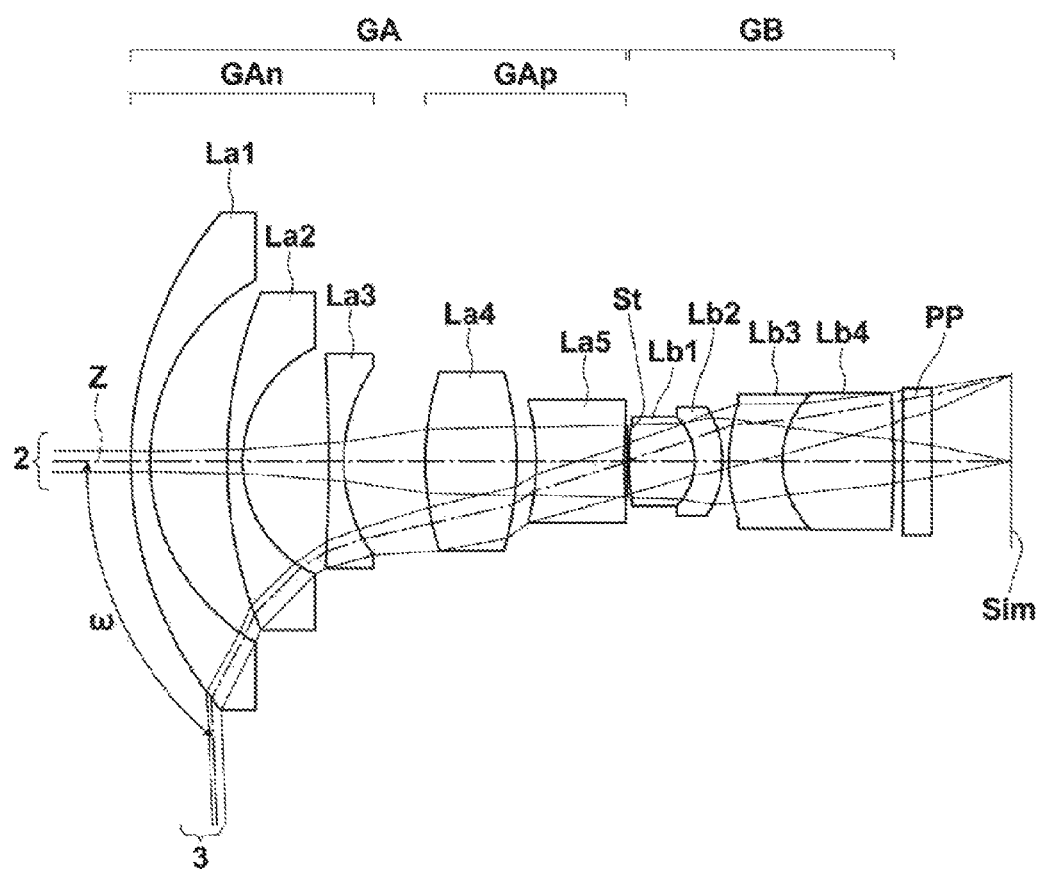
FIG. 4 is a sectional view showing the configuration of and optical paths through an imaging lens of Example 4 of the disclosure.

In the examples shown in FIGS. 1 and 3, the front-group positive lens group GAp has a three-lens configuration where a positive lens La4, a positive lens La5, and a negative lens La6 are arranged in this order from the object side. However, the front-group positive lens group GAp may have a four-lens configuration where a negative lens, a positive lens, a positive lens, and a negative lens are arranged in this order from the object side, as shown in FIG. 2, or a two-lens configuration where a positive lens and a negative lens are arranged in this order from the object side, as shown in FIG. 4. The positive lens(es) included in the front-group positive lens group GAp allows correcting spherical aberration, astigmatism, and lateral chromatic aberration. In the case where the front-group positive lens group GAp includes an additional negative lens other than the negative lens disposed at the most image-side position, the additional negative lens contributes to ensuring the negative refractive power of the front group GA to facilitate ensuring the back focus. The configuration of the front-group positive lens group GAp is not limited to the examples shown in FIGS. 1 to 5, and the front-group positive lens group GAp may consist essentially of at least two and not more than four lenses. This configuration is advantageous for achieving both good performance and size reduction.

The rear group GB includes two positive lenses and two negative lenses. Disposing two positive lenses in the rear group GB allows each of the positive lenses to share a part of the positive refractive power of the rear group GB while ensuring the positive refractive power of the rear group GB, and this is also advantageous for reducing the entire length of the lens system. The two negative lenses of the rear group GB allow correcting astigmatism, longitudinal chromatic aberration, and lateral chromatic aberration.

It is preferred that the rear group GB include at least one cemented lens. In particular, it is preferred that the rear group GB includes a cemented lens formed by, in order from the object side, a negative lens and a biconvex positive lens that are cemented together. In this case, the cemented surface is a convex surface toward the object side shape, and this allows successfully correcting lateral chromatic aberration, and is advantageous for accomplishing a high resolution lens system. It should be noted that disposing this cemented lens at the most image-side position of the at least one cemented lens included in the rear group GB is more advantageous for successfully correcting lateral chromatic aberration.

It is preferred that the rear group GB include a cemented lens that is formed by, in order from the object side, a positive lens and a negative lens that are cemented together, and has the cemented surface that is a convex surface toward the image side, and this cemented lens be disposed at the most object-side position of the at least one cemented lens of the rear group GB. In this case, the above cemented lens is disposed nearest to the aperture stop St among the at least one cemented lens included in the rear group GB, and this facilitates correcting spherical aberration while suppressing astigmatism.

In the examples shown in FIGS. 1 to 4, the rear group GB has a four-lens configuration where a positive lens Lb1 a negative lens Lb2, a negative lens Lb3, and a positive lens Lb4 are arranged in this order from the object side. In the examples shown in FIGS. 1, 2, and 4, the positive lens Lb1 and the negative lens Lb2 are cemented together, and the negative lens Lb3 and the positive lens Lb4 are cemented together.

In the examples shown in FIGS. 1 to 4, the positive lens Lb1 allows reducing the entire length of the lens system and reducing the lens diameter of the front group GA, and the negative lens Lb2 is advantageous for successfully correcting astigmatism and distortion. Further, each of the negative lens Lb3 and the positive lens Lb4 is advantageous for successfully correcting longitudinal chromatic aberration, lateral chromatic aberration, and astigmatism.

Figure 5:
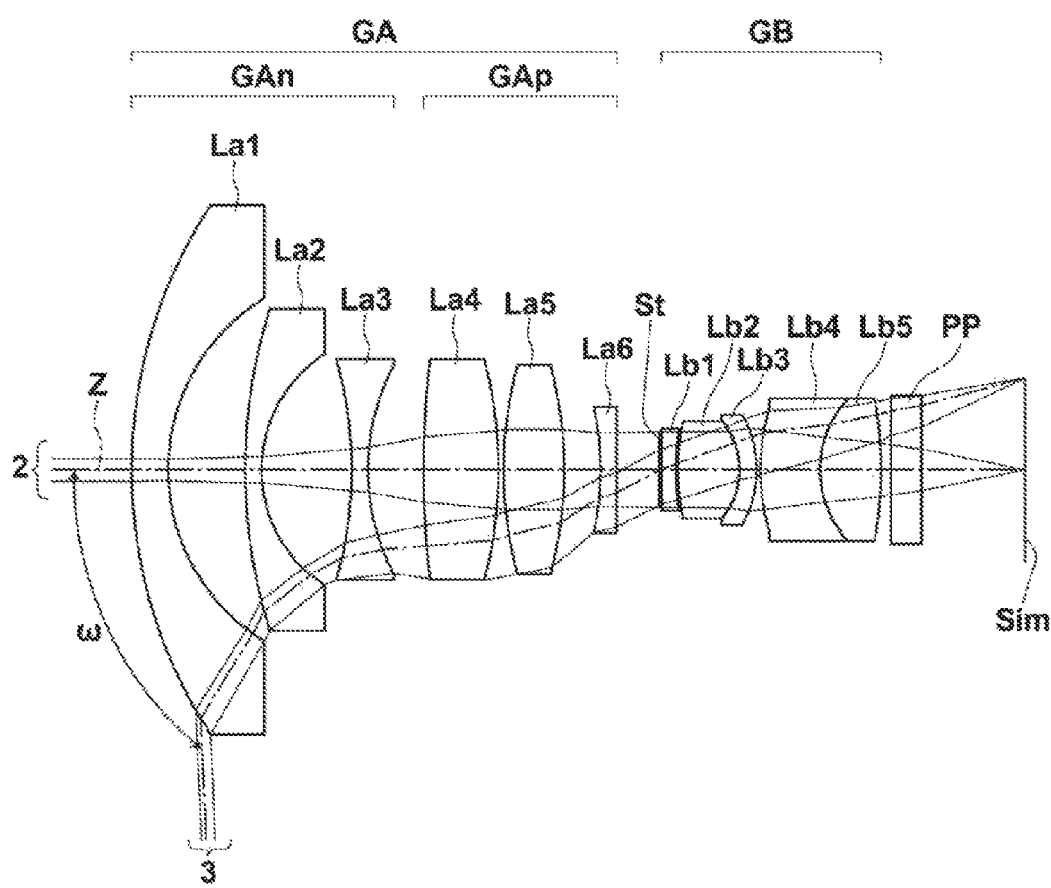
FIG. 5 is a sectional view showing the configuration of and optical paths through an imaging lens of Example 5 of the disclosure.

The rear group GB in the example shown in FIG. 5 includes a negative lens disposed at the most object-side position of the rear group GB in addition to the four lenses of the rear group GB in the examples shown in FIGS. 1 to 4, and this negative lens disposed at the most object-side position of the rear group GB is advantageous for successfully correcting astigmatism. The configuration of the rear group GB is not limited to those in the examples shown in FIGS. 1 to 5, and the rear group GB may consists essentially of at most five lenses. This is advantageous for achieving both good performance and size reduction.

Further, the configuration of the imaging lens of the disclosure is not limited to those in the examples shown in FIGS. 1 to 5, and the entire system may consist of at most eleven lenses. This is advantageous for size reduction.

This imaging lens is configured to satisfy the condition expression (1) below:

$$0.95 < -fAn/f < 2 \tag{1},$$

where fAn is a focal length of the front-group negative lens group, and f is a focal length of the entire system.

Setting the value of −fAn/f such that it does not become equal to or smaller than the lower limit of the condition expression (1) allows preventing the negative refractive power of the front-group negative lens group GAn from becoming excessively strong, and this allows successfully correcting spherical aberration and is advantageous for accomplishing a lens system having a small F-number. Setting the value of −fAn/f such that it does not become equal to or greater than the upper limit of the condition expression (1) allows reducing increase of the lens diameter of the front-group negative lens group GAn, which tends to be large, thereby allowing size reduction. In order to enhance the above-described advantageous effects with respect to the condition expression (1), it is more preferred that the condition expression (1-1) below be satisfied:

$$1 < -fAn/f < 1.5 \tag{1-1}.$$

It is preferred that this imaging lens satisfy the condition expression (2) below:

$$0.7 < -fA/fB < 10 \tag{2},$$

where fA is a focal length of the front group, and fB is a focal length of the rear group.

Setting the value of −fA/fB such that it does not become equal to or smaller than the lower limit of the condition expression (2) allows preventing the refractive power of the front group GA from becoming excessively strong relative to the refractive power of the rear group GB, and this facilitates correcting off-axis aberrations, such as distortion. Setting the value of −fA/fB such that it does not become equal to or greater than the upper limit of the condition expression (2) allows preventing the refractive power of the front group GA from becoming excessively weak relative to the refractive power of the rear group GB, and this facilitates ensuring the back focus. In order to enhance the above-described advantageous effects with respect to the condition expression (2), it is more preferred that the condition expression (2-1) below be satisfied:

$$0.75 < -fA/fB < 9 \quad (2\text{-}1).$$

It is preferred that this imaging lens satisfy the condition expression (3) below:

$$0.3 < f/fB < 0.6 \quad (3),$$

where fB is a focal length of the rear group, and f is a focal length of the entire system.

Setting the value of f/fB such that it does not become equal to or smaller than the lower limit of the condition expression (3) allows preventing the refractive power of the rear group GB from becoming excessively weak, and this allows successfully correcting astigmatism. Setting the value of fB such that it does not become equal to or greater than the upper limit of the condition expression (3) allows preventing the refractive power of the rear group GB from becoming excessively strong, and this facilitates ensuring the back focus. In order to enhance the above-described advantageous effects with respect to the condition expression (3), it is more preferred that the condition expression (3-1) below be satisfied:

$$0.305 < f/fB < 0.5 \quad (3\text{-}1).$$

It is preferred that this imaging lens satisfy the condition expressions (4) and (5) below:

$$55 < vd3 < 96 \quad (4),$$

$$0.003 < \Delta\theta gF3 < 0.05 \quad (5),$$

where vd3 is an Abbe number with respect to the d-line of the most image-side negative lens of the front-group negative lens group, and $\Delta\theta gF3$ is an anomalous dispersion property of the most image-side negative lens of the front-group negative lens group.

Now, the anomalous dispersion property $\Delta\theta gF$ is described. Assuming that the refractive index with respect to the g-line (the wavelength of 435.8 nm) of a lens is Ng, the refractive index with respect to the F-line (the wavelength of 486.1 nm) of the lens is NF, and the refractive index with respect to the C-line (the wavelength of 656.3 nm) of the lens is NC, a partial dispersion ratio $\theta gF$ between the g-line and the F-line is expressed as $\theta gF=(Ng-NF)/(NF-NC)$. On a two-dimensional Cartesian coordinate system with two axes where $\theta gF$ is plotted along the vertical axis and the Abbe number vd with respect to the d-line is plotted along the horizontal axis, a straight line connecting the coordinate point (vd=60.49, $\theta gF=0.5436$) of a standard reference glass type NSL7 (available from Ohara Inc.) and the coordinate point (vd=36.26, $\theta gF=0.5828$) of a standard reference glass type PBM2 (available from Ohara Inc.) is assumed to be a standard reference line. It should be noted that, on the above-described two-dimensional coordinate system, the direction in which $\theta gF$ increases is the upward direction along the vertical axis, and the direction in which vd increases is the leftward direction along the horizontal axis. $\Delta\theta gF$ of a certain lens represents a deviation of $\theta gF$ of the lens from the standard reference line on the two-dimensional coordinate system. In other words, $\Delta\theta gF$ of a certain lens represents a difference between the coordinate point for the certain lens and the standard reference line along a direction parallel to the vertical axis on the two-dimensional coordinate system. The symbol (positive or negative) of the value of $\Delta\theta gF$ is provided such that it is positive when the coordinate point for the lens is positioned above the standard reference line on the two-dimensional coordinate system, and is negative when the coordinate point for the lens is positioned below the standard reference line on the two-dimensional coordinate system.

Selecting the material from medium- to low-dispersion materials such that the condition expression (4) is satisfied facilitates successfully correcting lateral chromatic aberration. Further, selecting a material that has an anomalous dispersion property satisfying the condition expression (5) from materials that have Abbe numbers satisfying the condition expression (4) allows successfully correcting lateral chromatic aberration, in particular, successfully correcting secondary chromatic aberration. When a material that satisfies the condition expressions (4) and (5) is used to form the most image-side negative lens of the front-group negative lens group GAn, successful correction of lateral chromatic aberration can be achieved with a wide angle lens system, and this allows accomplishing a high resolution lens system.

In order to enhance the above-described advantageous effects with respect to the condition expression (4), it is more preferred that the condition expression (4-1) below be satisfied:

$$60 < vd3 < 70 \quad (4\text{-}1).$$

Further, in order to enhance the above-described advantageous effects with respect to the condition expression (5), it is more preferred that the condition expression (5-1) below be satisfied:

$$0.004 < \Delta\theta F3 < 0.006 \quad (5\text{-}1).$$

The above-described preferred configurations and possible configurations can be combined in any manner, and it is preferred that they are adopted as appropriate depending on the required specifications. By adopting the above-described configurations as appropriate, a wide-angle lens system that has a compact configuration, a small F-number, and high performance can be accomplished. It should be noted that the term "wide angle" as used herein refers to that the lens system has a full angle of view of at least 180°, and the term "small F-number" as used herein refers to an F-number of 2.6 or less when the lens system is focused on an object at infinity.

Next, numerical examples of the imaging lens of the disclosure are described. Values shown in Examples 1 to 5 below are normalized such that the focal length of the entire system when the imaging lens is focused on an object at infinity is 1.00.

EXAMPLE 1

The configuration of an imaging lens of Example 1 is as shown in FIG. 1. It should be noted that the details of each lens group and each lens in the configuration shown in FIG. 1 are as described above, and the same description is not repeated.

Table 1 shows lens data of the imaging lens of Example 1. In Table 1, each value in the column of "Si" represents the surface number of the i-th (where i=1, 2, 3, . . . ) surface, where the object-side surface of the most object-side element is the 1st surface and the number is sequentially incremented toward the image side, each value in the column of "Ri" represents the radius of curvature of the i-th surface, and each value in the column of "Di" represents the surface distance between the i-th surface and the i+1-th surface along the optical axis Z. The sign with respect to the radius of curvature is provided such that a positive radius of curvature indicates a surface shape that is convex toward the object side, and a negative radius of curvature indicates a surface shape that is convex toward the image side. The value at the bottom of the column of "Di" represents the distance between the optical member PP and the image plane Sim.

Further, in Table 1, each value in the column of "Ndj" represents the refractive index with respect to the d-line (the wavelength of 587.6 nm) of the j-th (where j=1, 2, 3, . . . ) element, where the most object-side element is the 1st element and the number is sequentially incremented toward the image side, each value in the column of "vdj" represents the Abbe number with respect to the d-line of the j-th element, and each value in the column of "ΔθgFj" represents the anomalous dispersion property of the j-th element. Table 1 also shows the aperture stop St, the optical member PP, and the image plane Sim. In Table 1, the surface number and the text "(St)" are shown at the position in the column of the surface number corresponding to the aperture stop St.

At the position above the frame of Table 1, the focal length f of the entire system, the back focus Bf in equivalent air distance, the F-number FNo., and the maximum full angle of view 2ω with respect to the d-line are shown. It should be noted that the numerical values shown in the tables below are rounded at predetermined decimal places.

TABLE 1

Example 1
f = 1.00, Bf = 2.15, FNo. = 2.55, 2ω = 185.0°

| Si | Ri | Di | Ndj | vdj | ΔθgFj |
|---|---|---|---|---|---|
| 1 | 8.9056 | 0.6893 | 1.90366 | 31.31 | 0.00391 |
| 2 | 3.4423 | 1.3317 | | | |
| 3 | 9.3427 | 0.2919 | 1.85026 | 32.27 | 0.00364 |
| 4 | 2.3768 | 1.6216 | | | |
| 5 | −6.2363 | 0.2957 | 1.61800 | 63.33 | 0.00509 |
| 6 | 4.0503 | 0.8208 | | | |
| 7 | 13.8774 | 1.4308 | 1.80518 | 25.42 | 0.01576 |
| 8 | −8.4386 | 0.0358 | | | |
| 9 | 6.9843 | 1.0685 | 1.80610 | 40.93 | −0.00516 |
| 10 | −6.9843 | 0.6997 | | | |
| 11 | −6.2712 | 0.3884 | 1.69680 | 55.53 | −0.00822 |
| 12 | 257.5490 | 0.9061 | | | |
| 13(St) | ∞ | 0.0358 | | | |
| 14 | 9.9090 | 1.1139 | 1.43700 | 95.10 | 0.04579 |
| 15 | −1.1923 | 0.5365 | 1.84666 | 23.78 | 0.01751 |
| 16 | −1.8865 | 0.0715 | | | |
| 17 | 3.9985 | 1.0109 | 1.84666 | 23.78 | 0.01751 |
| 18 | 1.6858 | 1.0731 | 1.61800 | 63.33 | 0.00509 |
| 19 | −26.1123 | 0.1788 | | | |
| 20 | ∞ | 0.5365 | 1.51680 | 64.20 | −0.00330 |
| 21 | ∞ | 1.6130 | | | |

Figure 6:
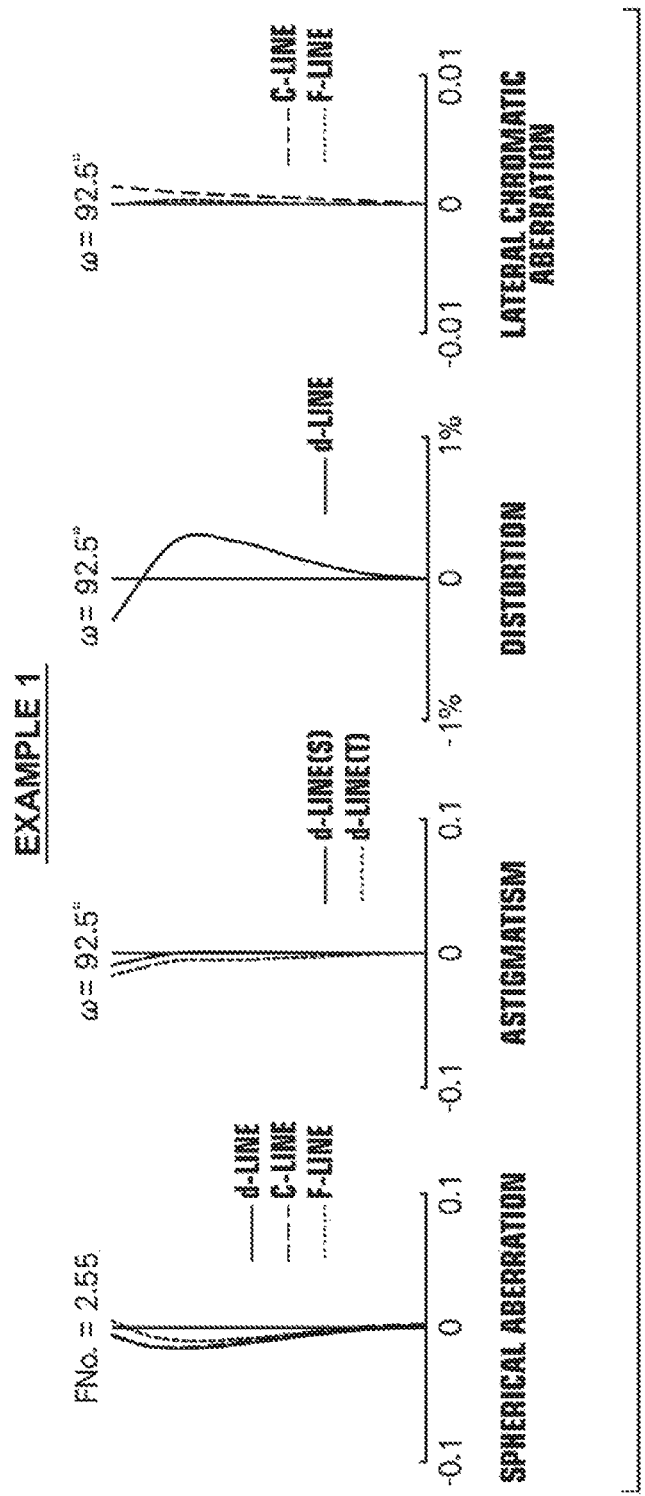
FIG. 6 shows aberration diagrams of the imaging lens of Example 1 of the disclosure, showing spherical aberration, astigmatism, distortion, and lateral chromatic aberration in this order from the left.

FIG. 6 shows aberration diagrams of the imaging lens of Example 1 when the imaging lens is focused on an object at infinity. FIG. 6 shows spherical aberration, astigmatism, distortion, and lateral chromatic aberration (magnification chromatic aberration) in this order from the left. In the diagram showing spherical aberration, aberrations with respect to the d-line (the wavelength of 587.6 nm), the C-line (the wavelength of 656.3 nm), and the F-line (the wavelength of 486.1 nm) are shown in the black solid line, the long dashed line, and the short dashed line, respectively. In the diagram showing astigmatism, aberrations in the sagittal direction and the tangential direction with respect to the d-line are shown in the solid line and the short dashed line, respectively. In the diagram showing distortion, aberrations with respect to the d-line on the basis of equidistant projection are shown in the solid line. In the diagram showing lateral chromatic aberration, aberrations with respect to the C-line and the F-line are shown in the long dashed line and the short dashed line, respectively. The symbol "FNo." in the diagram showing spherical aberration means "F-number", and the symbol "ω" in the other aberration diagrams means "half angle of view".

The symbols, the meanings, and the manners of description of the data explained above with respect to Example 1 also apply to the other examples described below, unless otherwise noted, and the same explanations are not repeated below.

EXAMPLE 2

Figure 7:
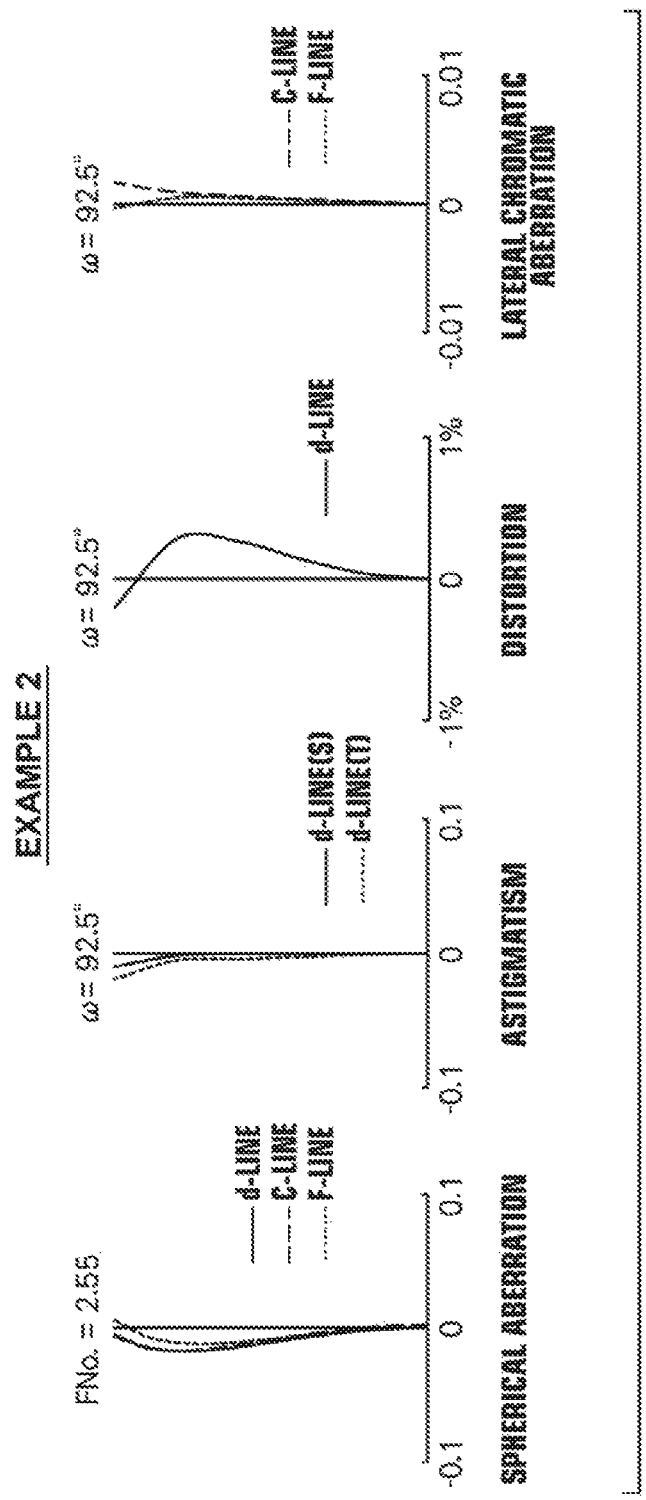
FIG. 7 shows aberration diagrams of the imaging lens of Example 2 of the disclosure, showing spherical aberration, astigmatism, distortion, and lateral chromatic aberration in this order from the left.

The configuration of an imaging lens of Example 2 is as shown in FIG. 2. In the imaging lens of Example 2, the front-group negative lens group GAn consists of lenses La1 to La3, the front-group positive lens group GAp consists of lenses La4 to La7, and the rear group GB consists of lenses Lb1 to Lb4. Table 2 shows lens data of the imaging lens of Example 2. FIG. 7 shows aberration diagrams of the imaging lens of Example 2 when the imaging lens is focused on an object at infinity.

TABLE 2

Example 2
f = 1.00, Bf = 2.26, FNo. = 2.55, 2ω = 185.0°

| Si | Ri | Di | Ndj | vdj | ΔθgFj |
|---|---|---|---|---|---|
| 1 | 9.1047 | 0.7055 | 1.90366 | 31.31 | 0.00391 |
| 2 | 3.4197 | 1.3197 | | | |
| 3 | 9.2525 | 0.2864 | 1.85026 | 32.27 | 0.00364 |
| 4 | 2.3784 | 1.5137 | | | |
| 5 | −8.5657 | 0.2863 | 1.61800 | 63.33 | 0.00509 |
| 6 | 4.0610 | 0.5243 | | | |
| 7 | 22.9665 | 0.9248 | 1.51633 | 64.14 | −0.00239 |
| 8 | 11.2072 | 0.9183 | 1.84666 | 23.78 | 0.01751 |
| 9 | −11.0359 | 0.0358 | | | |
| 10 | 6.9645 | 1.0738 | 1.83400 | 37.16 | −0.00374 |
| 11 | −6.9645 | 0.7224 | | | |
| 12 | −6.1731 | 0.2882 | 1.77250 | 49.60 | −0.00922 |
| 13 | 79.6172 | 0.8616 | | | |
| 14(St) | ∞ | 0.0577 | | | |
| 15 | 8.6800 | 1.0751 | 1.43700 | 95.10 | 0.04579 |
| 16 | −1.1640 | 0.5369 | 1.84666 | 23.78 | 0.01751 |
| 17 | −1.8402 | 0.0716 | | | |
| 18 | 4.0571 | 1.0204 | 1.84666 | 23.78 | 0.01751 |
| 19 | 1.7200 | 1.0738 | 1.61800 | 63.33 | 0.00509 |
| 20 | −17.9633 | 0.1790 | | | |
| 21 | ∞ | 0.5369 | 1.51680 | 64.20 | −0.00330 |
| 22 | ∞ | 1.7307 | | | |

EXAMPLE 3

Figure 8:
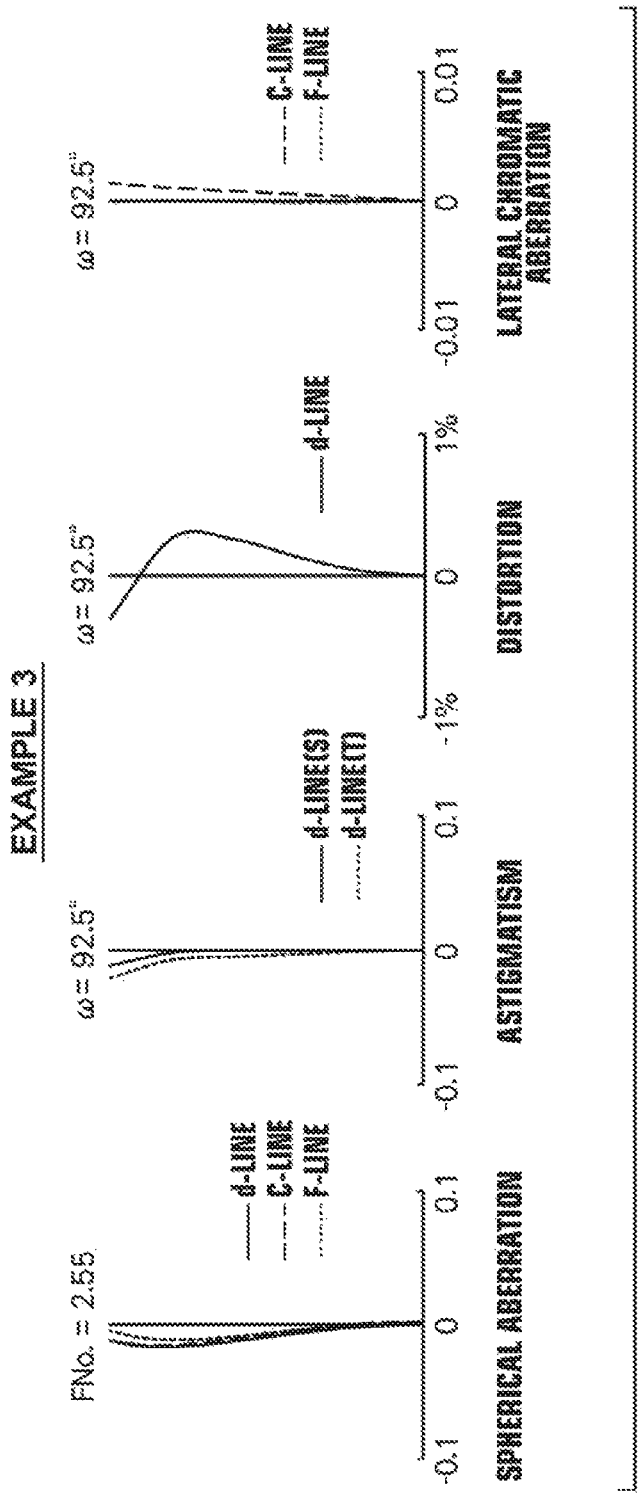
FIG. 8 shows aberration diagrams of the imaging lens of Example 3 of the disclosure, showing spherical aberration, astigmatism, distortion, and lateral chromatic aberration in this order from the left.

The configuration of an imaging lens of Example 3 is as shown in FIG. 3. In the imaging lens of Example 3, the front-group negative lens group GAn consists of lenses La1 to La3, the front-group positive lens group GAp consists of lenses La4 to La6, and the rear group GB consists of lenses Lb1 to Lb4. Table 3 shows lens data of the imaging lens of Example 3. FIG. 8 shows aberration diagrams of the imaging lens of Example 3 when the imaging lens is focused on an object at infinity.

TABLE 3

Example 3
f = 1.00, Bf = 2.41, FNo. = 2.55, 2ω = 185.0°

| Si | Ri | Di | Ndj | vdj | ΔθgFj |
|---|---|---|---|---|---|
| 1 | 8.7150 | 0.5788 | 1.90366 | 31.31 | 0.00391 |
| 2 | 3.5608 | 1.3343 | | | |

TABLE 3-continued

Example 3
f = 1.00, Bf = 2.41, FNo. = 2.55, 2ω = 185.0°

| Si | Ri | Di | Ndj | νdj | ΔθgFj |
|---|---|---|---|---|---|
| 3 | 8.8901 | 0.2861 | 1.85026 | 32.27 | 0.00364 |
| 4 | 2.4650 | 1.6807 | | | |
| 5 | −6.3968 | 0.3710 | 1.61800 | 63.33 | 0.00509 |
| 6 | 4.1489 | 1.0731 | | | |
| 7 | 16.2728 | 1.4308 | 1.80518 | 25.42 | 0.01576 |
| 8 | −8.7085 | 0.0361 | | | |
| 9 | 7.6986 | 1.0062 | 1.80610 | 40.93 | −0.00516 |
| 10 | −7.6986 | 0.9406 | | | |
| 11 | −5.3978 | 0.5364 | 1.69680 | 55.53 | −0.00822 |
| 12 | 25.4152 | 0.6392 | | | |
| 13(St) | ∞ | 0.0358 | | | |
| 14 | 5.0061 | 1.1868 | 1.43700 | 95.10 | 0.04579 |
| 15 | −1.4716 | 0.0358 | | | |
| 16 | −1.4143 | 0.5365 | 1.84666 | 23.78 | 0.01751 |
| 17 | −2.1751 | 0.0715 | | | |
| 18 | 4.3163 | 0.9548 | 1.84666 | 23.78 | 0.01751 |
| 19 | 1.7670 | 1.0731 | 1.61800 | 63.33 | 0.00509 |
| 20 | −9.6984 | 0.1788 | | | |
| 21 | ∞ | 0.5365 | 1.51680 | 64.20 | −0.00330 |
| 22 | ∞ | 1.8807 | | | |

EXAMPLE 4

Figure 9:
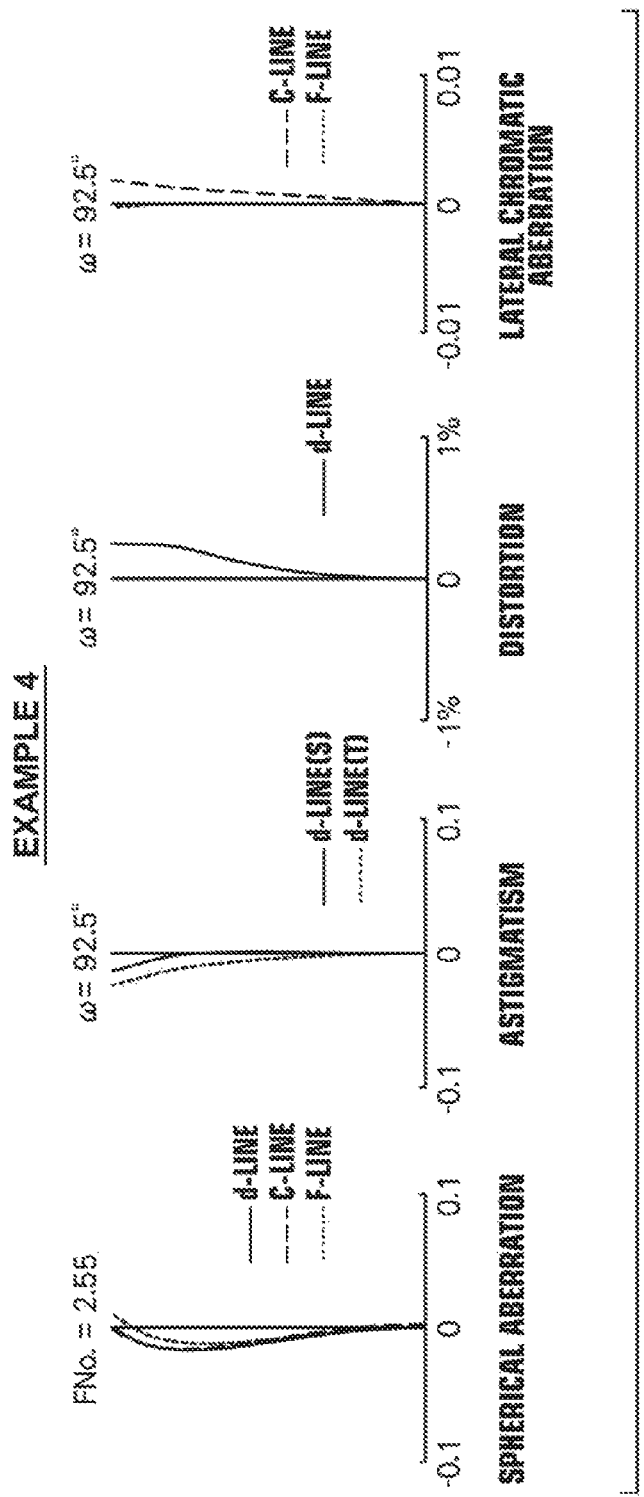
FIG. 9 shows aberration diagrams of the imaging lens of Example 4 of the disclosure, showing spherical aberration, astigmatism, distortion, and lateral chromatic aberration in this order from the left.

The configuration of an imaging lens of Example 4 is as shown in FIG. 4. In the imaging lens of Example 4, the front-group negative lens group GAn consists of lenses La1 to La3, the front-group positive lens group GAp consists of lenses La4 to La5, and the rear group GB consists of lenses Lb1 to Lb4. Table 4 shows lens data of the imaging lens of Example 4. FIG. 9 shows aberration diagrams of the imaging lens of Example 4 when the imaging lens is focused on an object at infinity.

TABLE 4

Example 4
f = 1.00, Bf = 2.04, FNo. = 2.55, 2ω = 185.0°

| Si | Ri | Di | Ndj | νdj | ΔθgFj |
|---|---|---|---|---|---|
| 1 | 7.2695 | 0.3620 | 2.00100 | 29.13 | 0.00506 |
| 2 | 3.9063 | 1.4534 | | | |
| 3 | 8.2551 | 0.2877 | 1.77250 | 49.60 | −0.00922 |
| 4 | 2.3345 | 1.6210 | | | |
| 5 | −36.7670 | 0.2877 | 1.59349 | 67.00 | 0.00363 |
| 6 | 3.0700 | 1.5382 | | | |
| 7 | 5.3464 | 1.7259 | 1.85478 | 24.80 | 0.01086 |
| 8 | −5.9516 | 0.3684 | | | |
| 9 | −4.4423 | 1.6555 | 1.54072 | 47.23 | 0.00005 |
| 10 | 7.4541 | 0.0602 | | | |
| 11(St) | ∞ | 0.0380 | | | |
| 12 | 5.6561 | 1.2398 | 1.43700 | 95.10 | 0.04579 |
| 13 | −1.1961 | 0.5234 | 1.84666 | 23.78 | 0.01751 |
| 14 | −1.8749 | 0.1209 | | | |

TABLE 4-continued

Example 4
f = 1.00, Bf = 2.04, FNo. = 2.55, 2ω = 185.0°

| Si | Ri | Di | Ndj | νdj | ΔθgFj |
|---|---|---|---|---|---|
| 15 | 3.5117 | 1.0061 | 1.84666 | 23.78 | 0.01751 |
| 16 | 1.7785 | 2.0944 | 1.61800 | 63.33 | 0.00509 |
| 17 | −20.3091 | 0.1798 | | | |
| 18 | ∞ | 0.5394 | 1.51680 | 64.20 | −0.00330 |
| 19 | ∞ | 1.5008 | | | |

EXAMPLE 5

Figure 10:
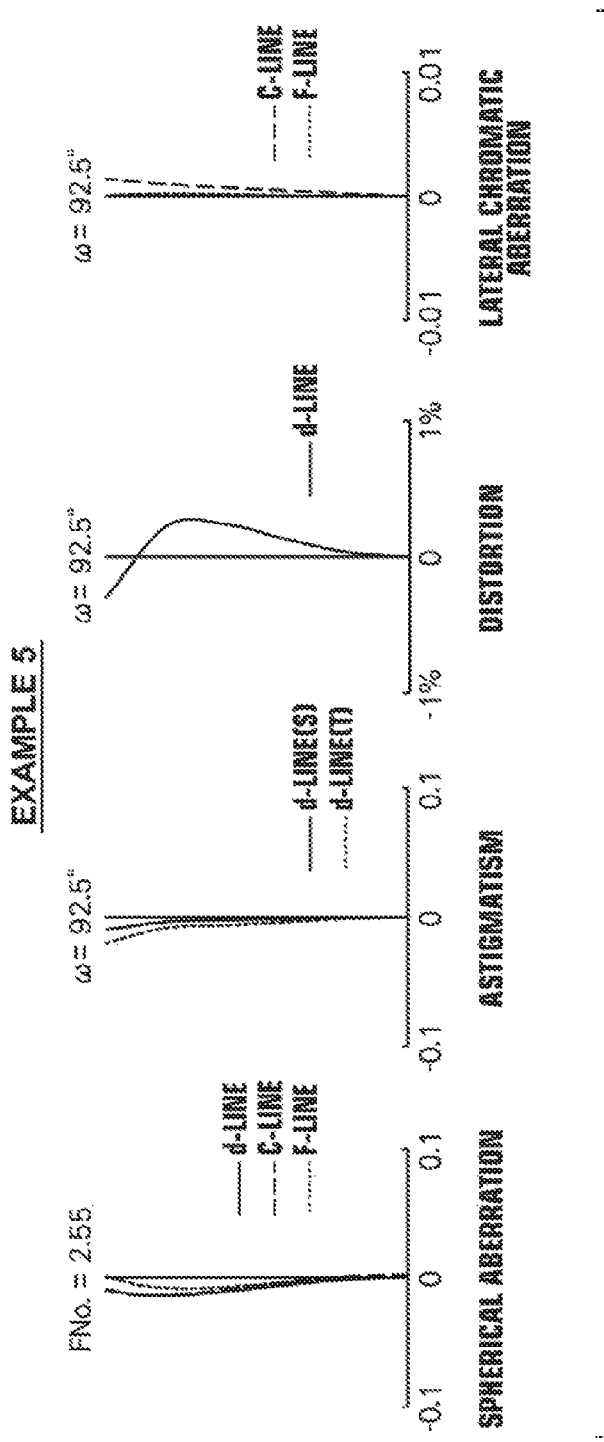
FIG. 10 shows aberration diagrams of the imaging lens of Example 5 of the disclosure, showing spherical aberration, astigmatism, distortion, and lateral chromatic aberration in this order from the left.

The configuration of an imaging lens of Example 5 is as shown in FIG. 5. In the imaging lens of Example 5, the front-group negative lens group GAn consists of lenses La1 to La3, the front-group positive lens group GAp consists of lenses La4 to La6, and the rear group GB consists of lenses Lb1 to Lb5. Table 5 shows lens data of the imaging lens of Example 5. FIG. 10 shows aberration diagrams of the imaging lens of Example 5 when the imaging lens is focused on an object at infinity.

TABLE 5

Example 5
f = 1.00, Bf = 2.36, FNo. = 2.55, 2ω = 185.0°

| Si | Ri | Di | Ndj | νdj | ΔθgFj |
|---|---|---|---|---|---|
| 1 | 8.4534 | 0.6434 | 1.90366 | 31.31 | 0.00391 |
| 2 | 3.5169 | 1.3549 | | | |
| 3 | 9.3471 | 0.2872 | 1.85026 | 32.27 | 0.00364 |
| 4 | 2.3994 | 1.5916 | | | |
| 5 | −7.0031 | 0.2863 | 1.61800 | 63.33 | 0.00509 |
| 6 | 3.8852 | 0.9849 | | | |
| 7 | 16.8393 | 1.3167 | 1.80518 | 25.42 | 0.01576 |
| 8 | −7.7258 | 0.0956 | | | |
| 9 | 6.8951 | 1.0720 | 1.80610 | 40.93 | −0.00516 |
| 10 | −6.8951 | 0.6424 | | | |
| 11 | −4.9662 | 0.2862 | 1.69680 | 55.53 | −0.00822 |
| 12 | −1207.2236 | 0.7483 | | | |
| 13(St) | ∞ | 0.0358 | | | |
| 14 | 32.5751 | 0.2531 | 1.51680 | 64.20 | −0.00330 |
| 15 | 4.0774 | 0.0358 | | | |
| 16 | 4.0152 | 1.0906 | 1.43700 | 95.10 | 0.04579 |
| 17 | −1.3191 | 0.2997 | 1.84666 | 23.78 | 0.01751 |
| 18 | −1.9817 | 0.0715 | | | |
| 19 | 3.9926 | 1.0459 | 1.84666 | 23.78 | 0.01751 |
| 20 | 1.8223 | 1.0731 | 1.61800 | 63.33 | 0.00509 |
| 21 | −7.1594 | 0.1788 | | | |
| 22 | ∞ | 0.5365 | 1.51680 | 64.20 | −0.00330 |
| 23 | ∞ | 1.8311 | | | |

Table 6 shows values corresponding to the condition expressions (1) to (5) of the imaging lenses of Examples 1 to 5. Among the values shown in Table 6, the values corresponding to the condition expressions (1) to (4) are with respect to the d-line.

TABLE 6

| No. | | Example 1 | Example 2 | Example 3 | Example 4 | Example 5 |
|---|---|---|---|---|---|---|
| (1) | −fAn/f | 1.033 | 1.102 | 1.089 | 1.306 | 1.078 |
| (2) | −fA/fB | 8.673 | 2.645 | 1.636 | 0.795 | 5.025 |
| (3) | f/fB | 0.307 | 0.322 | 0.318 | 0.360 | 0.311 |
| (4) | νd3 | 63.33 | 63.33 | 63.33 | 67.00 | 63.33 |
| (5) | ΔθgF3 | 0.00510 | 0.00510 | 0.00510 | 0.00363 | 0.00510 |

As can be seen from the data shown above, each of the imaging lenses of Examples 1 to 5 accomplishes a fisheye lens system where the entire system consists of at least nine and not more than eleven lenses, which is compact, has a small F-number of 2.55, and has a wide angle of view with a maximum full angle of view of about 185°, while achieving high optical performance with successfully corrected aberrations.

Figure 11:
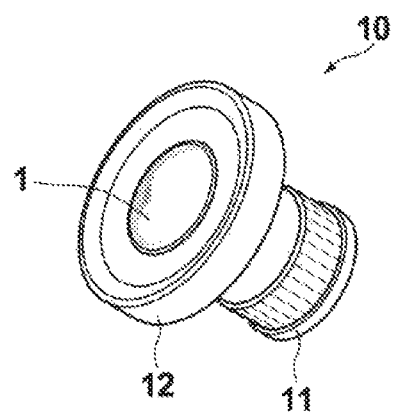
FIG. 11 is a perspective view of an imaging apparatus according to one embodiment of the disclosure.

Next, an imaging apparatus according to an embodiment of the disclosure is described. A camera 10 shown in FIG. 11 is an imaging apparatus according to one embodiment of the disclosure. This camera 10 is a monitoring camera where a lens barrel 12 housing an imaging lens 1 according to an embodiment of the disclosure is mounted on a camera body 11. An image sensor (not shown) is disposed in the camera body 11. This image sensor captures an optical image formed by the imaging lens 1 and converts the image into an electric signal, and the imaging surface of the image sensor is positioned at the same position as the image plane of the imaging lens. As the image sensor, for example, a CCD (Charge Coupled Device) or a CMOS (Complementary Metal Oxide Semiconductor) can be used.

The camera 10 of this embodiment is provided with the imaging lens 1 according to an embodiment of the present disclosure, and therefore allows size reduction of the apparatus, can accommodate low light environment, can perform imaging with a wide angle of view, and allows obtaining high image-quality images.

The present disclosure has been described with reference to the embodiments and the examples. However, the disclosure is not limited to the above-described embodiments and examples, and various modifications may be made to the disclosure. For example, the values of the radius of curvature, the surface distance, the refractive index, the Abbe number, etc., of each lens are not limited to the values shown in the above-described examples, and may be different values.

While the above-described embodiment of the imaging apparatus is described and shown in the drawing as a monitoring camera as an example, the imaging apparatus of the disclosure is not limited to the above-described example, and the disclosure is also applicable to various imaging apparatuses, such as vehicle mounted cameras and digital cameras.

What is claimed is:

1. An imaging lens consisting of, in order from the object side, a front group having a negative refractive power, a stop, and a rear group having a positive refractive power,
   wherein the front group consists of, in order from the object side, a front-group negative lens group having a negative refractive power and a front-group positive lens group having a positive refractive power,
   the front-group negative lens group consists of three negative lenses,
   the front-group positive lens group includes one positive lens and one negative lens that is disposed at the most image-side position of the front-group positive lens group,
   the rear group includes two positive lenses and two negative lenses, and
   the condition expression (1) below is satisfied:

$$0.95 < -fAn/f < 2 \qquad (1),$$

where fAn is a focal length of the front-group negative lens group, and f is a focal length of the entire system.

2. The imaging lens as claimed in claim 1, wherein the condition expression (2) below is satisfied:

$$0.7 < -fA/fB < 10 \qquad (2),$$

where fA is a focal length of the front group, and fB is a focal length of the rear group.

3. The imaging lens as claimed in claim 2, wherein the condition expression (2-1) below is satisfied:

$$0.75 < -fA/fB < 9 \qquad (2\text{-}1).$$

4. The imaging lens as claimed in claim 1, wherein the condition expression (3) below is satisfied:

$$0.3 < f/fB < 0.6 \qquad (3),$$

where fB is a focal length of the rear group.

5. The imaging lens as claimed in claim 4, wherein the condition expression (3-1) below is satisfied:

$$0.305 < f/fB < 0.5 \qquad (3\text{-}1).$$

6. The imaging lens as claimed in claim 1, wherein the condition expressions (4) and (5) below are satisfied:

$$55 < vd3 < 96 \qquad (4), \text{ and}$$

$$0.003 < \Delta\theta gF3 < 0.05 \qquad (5),$$

where vd3 is an Abbe number with respect to the d-line of the most image-side negative lens of the front-group negative lens group, and $\Delta\theta gF3$ is an anomalous dispersion property of the most image-side negative lens of the front-group negative lens group.

7. The imaging lens as claimed in claim 6, wherein the condition expression (4-1) below is satisfied:

$$60 < vd3 < 70 \qquad (4\text{-}1).$$

8. The imaging lens as claimed in claim 6, wherein the condition expression (5-1) below is satisfied:

$$0.004 < \Delta\theta gF3 < 0.006 \qquad (5\text{-}1).$$

9. The imaging lens as claimed in claim 1, wherein each of the first and the second lenses from the object side of the front-group negative lens group is a negative meniscus lens with the convex surface toward the object side.

10. The imaging lens as claimed in claim 1, wherein the rear group includes a cemented lens formed by, in order from the object side, a negative lens and a biconvex positive lens that are cemented together.

11. The imaging lens as claimed in claim 1, wherein the rear group includes at least one cemented lens, wherein the most object-side cemented lens of the at least one cemented lens included in the rear group is formed by, in order from the object side, a positive lens and a negative lens that are cemented together, and has the cemented surface that is a convex surface toward the image side.

12. The imaging lens as claimed in claim 1, wherein the condition expression (1-1) below is satisfied:

$$1 < -fAn/f < 1.5 \qquad (1\text{-}1).$$

13. An imaging apparatus comprises the imaging lens as claimed in claim 1.

* * * * *